United States Patent
Xu et al.

(10) Patent No.: US 11,321,741 B2
(45) Date of Patent: May 3, 2022

(54) USING A MACHINE-LEARNED MODEL TO PERSONALIZE CONTENT ITEM DENSITY

(71) Applicant: Microsoft Technology Licensing, LLC, Redmond, WA (US)

(72) Inventors: Zhiyuan Xu, Mountain View, CA (US); Jinyun Yan, Sunnyvale, CA (US); Shaunak Chatterjee, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/774,090

(22) Filed: Jan. 28, 2020

(65) Prior Publication Data

US 2021/0233119 A1 Jul. 29, 2021

(51) Int. Cl.
*G06Q 30/00* (2012.01)
*G06Q 30/02* (2012.01)
*G06N 20/00* (2019.01)

(52) U.S. Cl.
CPC ......... *G06Q 30/0269* (2013.01); *G06N 20/00* (2019.01)

(58) Field of Classification Search
CPC .......................... G06Q 30/0269; G06N 20/00
See application file for complete search history.

(56) References Cited

U.S. PATENT DOCUMENTS

| | | | | |
|---|---|---|---|---|
| 2011/0099059 A1* | 4/2011 | Agarwal | ............ | G06Q 30/0256 705/14.43 |
| 2016/0188734 A1* | 6/2016 | Morley | ............. | G06F 16/24575 707/734 |
| 2017/0061462 A1* | 3/2017 | Bhalgat | ................... | H04L 51/32 |
| 2017/0186030 A1* | 6/2017 | Jiang | ..................... | G06F 16/245 |
| 2018/0197097 A1* | 7/2018 | Chatterjee | ............. | G06N 5/003 |
| 2018/0253800 A1* | 9/2018 | Feldman | ............ | G06Q 30/0254 |
| 2019/0102806 A1* | 4/2019 | Doshi | ............... | G06Q 30/0244 |
| 2019/0139096 A1* | 5/2019 | Chen | .................. | G06Q 30/0269 |
| 2020/0099746 A1* | 3/2020 | Tiwana | .............. | H04L 67/1097 |

OTHER PUBLICATIONS

Anonymous; Item Recommendations; ip.com 2019; 32 pages; Jan. 15, 2019.*
Nadeem; Content Aware System for Sequential Item Recommendation; Quizlet; 6 pages; Apr. 4, 2019.*

* cited by examiner

*Primary Examiner* — Radu Andrei
(74) *Attorney, Agent, or Firm* — Nicholson De Vos Webster & Elliott LLP

(57) ABSTRACT

Techniques for using a machine-learned model to personalize content item density. In one technique, an entity that is associated with a content request is identified. Multiple sets of content items are identified that includes content items of different types. A first position of a first slot is determined in a content item feed that comprises multiple slots. A second position of a previous content item is determined, in the content item feed, that is of a first type. A difference between the first position and the second position is determined. Based on the difference, a gap sensitivity value that is associated with the entity and is different than the difference is determined. Based on the gap sensitivity value, a content item from the multiple sets of content items is selected and inserted into the first slot. The content item feed is transmitted to a computing device to be presented thereon.

20 Claims, 9 Drawing Sheets

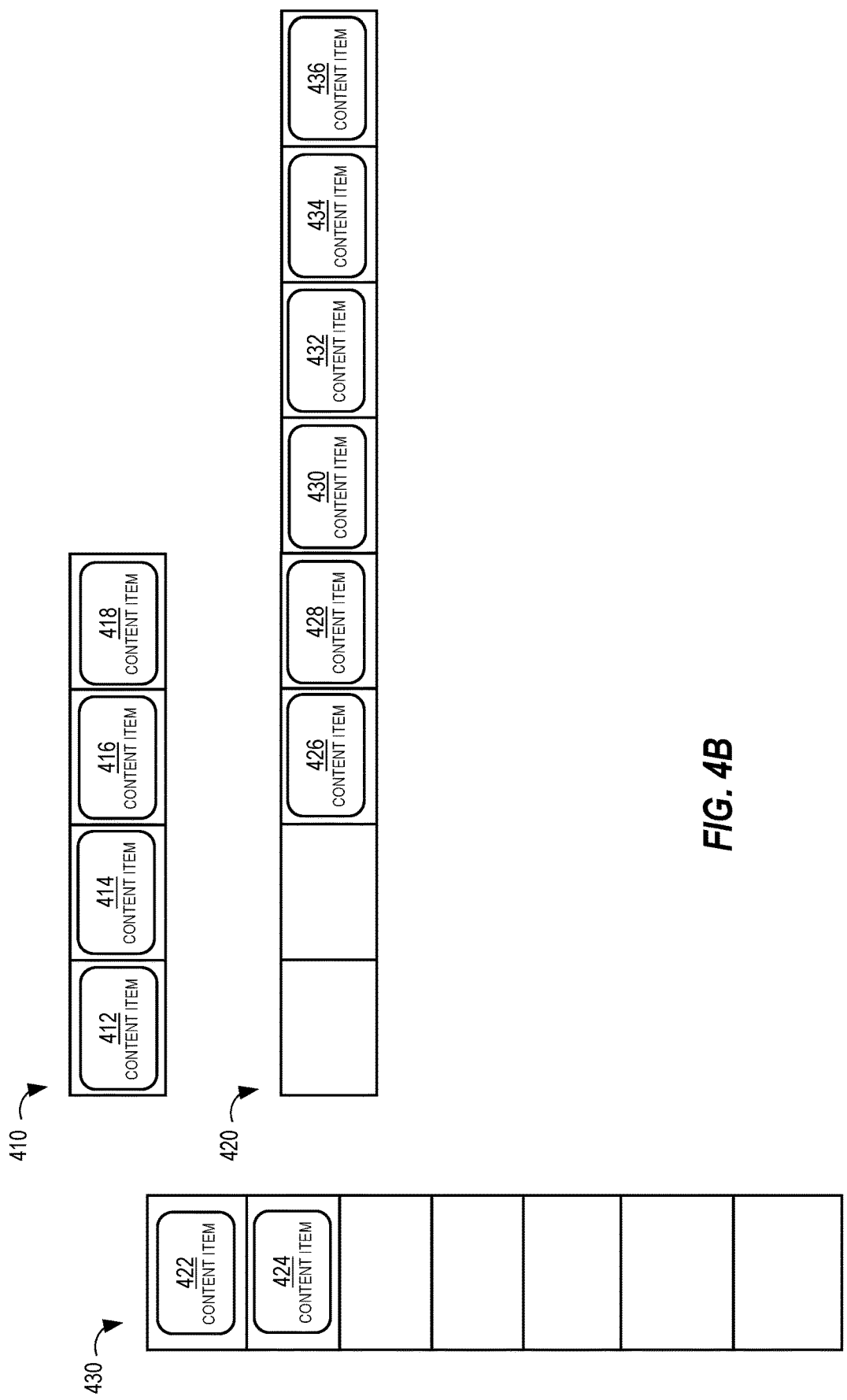

USING A MACHINE-LEARNED MODEL TO PERSONALIZE CONTENT ITEM DENSITY

TECHNICAL FIELD

The present disclosure relates to network-transferred electronic content items and, more particularly to, using a machine-learning model to individualize the density of certain types of electronic content items based on different client devices.

BACKGROUND

The Internet has enabled the delivery of electronic content to billions of people. Some content providers desire to send additional content items to users who visit a website hosted by a third-party publisher system. To do so, content providers may rely on a content delivery service that delivers the additional content items to computing devices of such users. In one approach, a content provider provides, to the content delivery service, data that indicates one or more user attributes that users must satisfy in order to receive the additional content items. The content delivery service creates a content delivery campaign that includes the data and is intended for sending additional content items to computing devices of users who will visit the website. However, if too many content items of a particular type are displayed at one time, then users that are not interested in content items of that type will begin to ignore those content items completely and will be less likely to interact with those content items.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 4A-4E are block diagrams that depict two example queues and an example content item feed after the performance of different blocks of the above example process for inserting content items from different queues into a single content item feed, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for using a machine-learned model to personalize the density of content items of a particular type in a content item feed are provided. In one technique, a minimum gap value is defined and used to dictate how close content items of the particular type may appear in web content, such as a feed. Performance of content items of the particular type is monitored and used to determine whether to adjust the minimum gap. In one technique, a PID controller is implemented that adjusts the minimum gap value in response to changes in performance.

Embodiments described herein improve computer technology. Current approaches to including content items of the particular type in web content did not consider user "blindness" of such content items when selecting how many content items to insert and/or how to space the content items in the web content. Instead, current approaches relied simply on relevancy or value of the content items to the host platform in determining what to display in web content. Embodiments result in decreased blindness, increased user engagement, and increased value of the content items. Furthermore, embodiments described herein involve a new type of information, namely a personalized gap sensitivity value, and a technique for leveraging this new type of information.

Additionally, embodiments involve a specific manner of automatically presenting content items to a user based on output from a machine-learned model regarding similar users. This provides a specific improvement over prior systems resulting in an improved user interface for electronic devices.

System Overview

Figure 1:
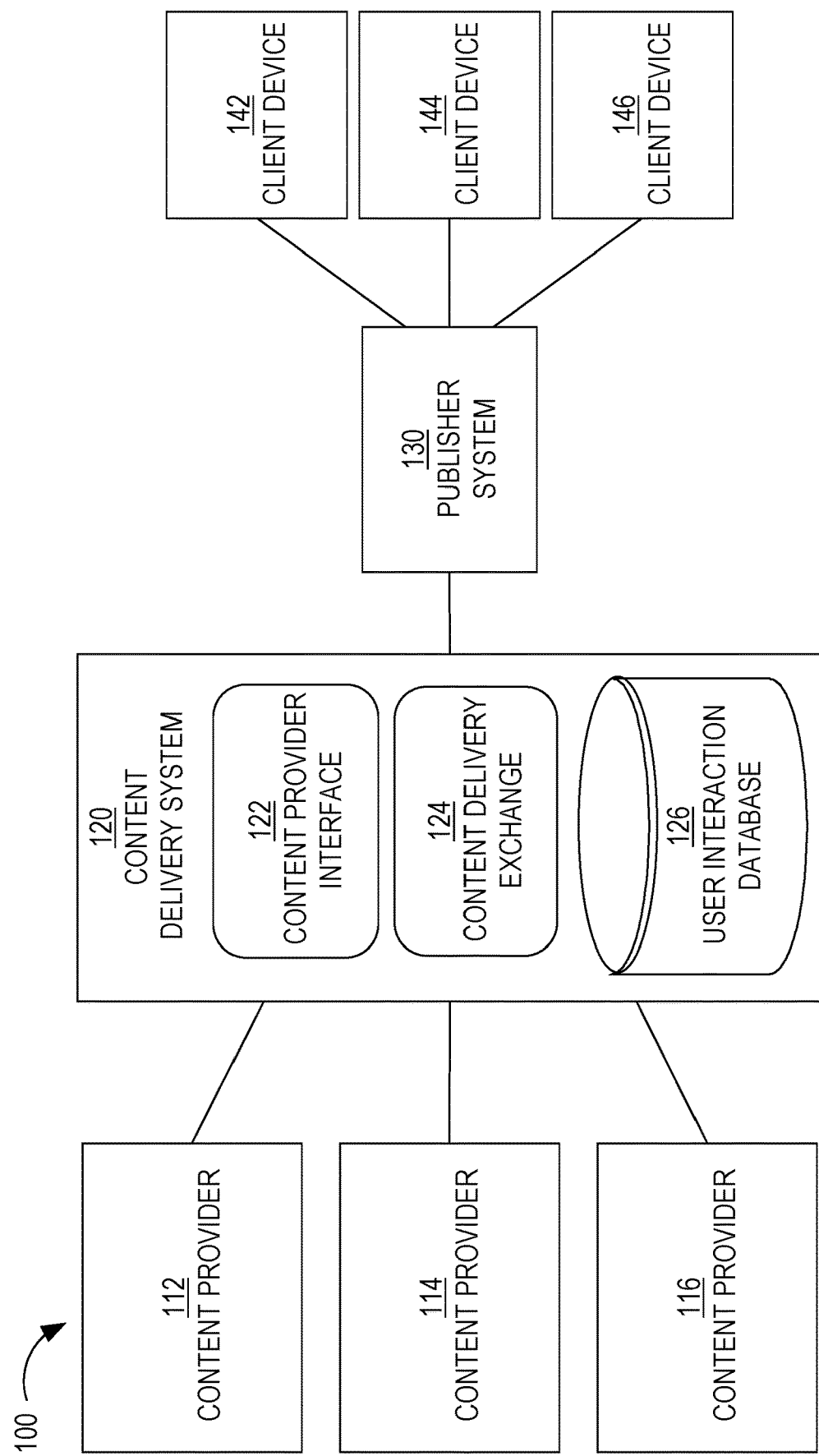
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item summaries, across client devices 152-156 (and other client devices not depicted). For example, content delivery system 120 determines whether a content item summary that content delivery exchange 124 delivers is presented at (e.g., displayed by or played back at) a client device. Such an "event" is referred to as an "impression." As another example, content delivery system 120 determines whether a content item summary that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item summary. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item summary, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item summary, content delivery system 120 may calculate a CTR for the content item summary.

Content Item Feeds

A content item feed is a set of content items that is presented on a screen of a client device. A content item feed (or simply "feed") includes user interface controls for scrolling through the feed. A user interface control for receiving user input to scroll through a feed is referred to as a scroll element or "thumb." Content items within a feed may be scrolled up and down or side to side. A feed may have a limited number of content items or may be an "infinite" feed where, as the feed is being scrolled through (whether automatically or in response to user input), additional content items (that have not yet been presented in the feed) are presented.

A content item feed contains multiple types of content items. One type of content item (referred to herein as the "first type") is one that has been created by one of content providers 112-116 and that is, optionally, associated with a content delivery campaign having targeting criteria that are used to identify the user or client device that is presenting the content item.

Another type of content item (referred to herein as the "second type") is content that is generated based on activity of users in an online network of the user that is viewing the content item. Examples of such a content item include a content item identifying an article authored by a friend or connection of the user in the online network, a content item identifying an article interacted (e.g., selected, viewed, commented, liked, shared) by such a friend or connection, a content item identifying a change in a status of such a friend, a content item identifying news pertaining to an organization (e.g., company, academic institution, community organization) with which the user is associated or affiliated, with which the user has explicitly followed, or of which the user is a member (e.g., as specified in the user's online social network). Such content items originate from content delivery system 120 and/or publisher system 130.

Another type of content item (referred to herein as the "third type") is a content item indicating a type of content in which content delivery system 120 (or an affiliated system) predicts the user might be interested. Examples of types of recommended content include people (i.e., potential friends/connections), jobs, and video courses. Such content items do not originate from content providers 112-116 and are not part of a content delivery campaign. However, the source of the jobs and the authors/providers of the video courses may be third-party entities relative to content delivery system 120 and/or publisher system 130.

Ranking Content Items in a Feed

The number of content items that may be presented to a user in a content item feed may be practically limitless. Thus, to ensure user engagement and interest in the content item feed, content delivery system 120 (or publisher system 130) ranks the possible content items according to one or more ranking criteria. Example ranking criteria include actual user selection rate of each content item, predicted user selection rate of each content item, and value to content delivery system 120 or publisher system 130. The "value" may be a bid value that represents how much a content provider (e.g., content provider 112) will compensate content delivery exchange 120 for presenting the content item or if the user selects the content item. "Value" may correspond to another metric, such as a value to publisher system 130 if the content item is selected. Different types of content items (e.g., second type versus third type), different content items of the first type, and different sub-types of content items (e.g., job recommendations versus course recommendations) may be associated with different values.

Content Item Blindness

If content items of a particular type are displayed too frequently, then users may become "blind" to that type of content item. "Blindness" is a phenomenon where a user or group of users consciously or subconsciously ignore content items of a particular type when browsing a content item feed. Such content items become "invisible" to the user(s). Increased blindness of certain types of content items may have multiple negative consequences, such as decreased user engagement with publisher system 130 and a decrease in long term monetization power of content delivery system 120.

Based on experiments, a correlation exists between blindness and density of content items of a particular type. "Density" refers to how frequently content items of a particular type appear in content item feed. 100% density of a particular type means that the entire feed contains content items of the particular type. Similarly, 10% density means that 10% of the content items in a feed are of the particular type. Even spacing between content items may be enforced. For example, enforcing even spacing of 33% density of a particular type of content item means that every third content item in a feed is of the particular type.

As density of content items of the first type increases, blindness tends to increase. Conversely, as density of content items of the first type decreases, users can unlearn their "blindness" and increase selection (e.g., click) propensity to some extent.

Parameters for Placing Content Items of the First Type Within a Feed

In an embodiment, content delivery system 120 or publisher system 130 ensures that content items of the first type are not presented too frequently within a single content item feed. Multiple parameters may be used to determine where and how often content items of the first type appear in a feed. One parameter is "minimum gap" whose value defines a minimum gap in a content item feed between two consecutive content items of the first type. For example, a minimum gap of four indicates that there must be at least four content items of the second type or third type between two content items of the first type in a content item feed.

Another parameter is "top slot" whose value defines the highest position where content items of the first type can be shown in a content item feed. For example, if the value of the top slot parameter is three, then the highest ranked content item of the first type may be placed in the third slot in the feed, but no higher.

Another parameter is "shadow bid." The value of shadow bid indicates a value of user engagement with publisher system 130. Shadow bid is a value for both content items of the first type (e.g., advertisements) and content items of other types, such as organic content items. In one approach, shadow bid is a constant value for all content items, regardless of type. In another approach, the shadow bid for content items of the first type is lower than the shadow bid for content items of other types.

When determining whether to insert a content item of the first type or a content item of a second type in a slot of a content item feed, at least two content items are considered: (1) the top ranked content item from a first set of ordered set of content items of the first type and (2) the top ranked content item from a second set of ordered set of content items of the second type. If there are additional types and they are treated separately from each other, then there may be one or more other sets of content items of those types. Each slot represents an opportunity satisfy multiple objectives, such as raising revenue and increasing engagement. While content items of the first type result in revenue if displayed or selected, content items of the second type generally do not result in revenue when displayed or selected. Thus, for content items of the second type, their overall value comes in the form of the shadow bid and the probability of being selected (or otherwise interacted with).

In contrast, the probability of interacting with (e.g., selecting) content items of the first type may be much lower than the probability of interacting with content items of other types. Because shadow bid is combined with (e.g., multiplied by) the probability of user engagement, the higher the shadow bid, the more likely the overall value of a content item of a second type will exceed the value of a content item of the first type.

If shadow bid is the only one of these three parameters that is defined, then it would be possible that (a) very few or no content items of the first type would be presented in a content item feed or (b) the content item feed might almost entirely consist of content items of the first type. Either scenario is not ideal since the former (a) would result in little revenue and the latter (b) might result in user disengagement from publisher system 130 altogether.

Personalized Gap Sensitivity Values

In an embodiment, a personalized gap sensitivity value is generated based on performance data for an individual user and is used to determine which candidate content items to insert into a content item feed. The performance data corresponds to actual user selection history of content items of the first type.

In an embodiment, a machine-learned model is trained based on training data using one or more machine learning techniques. Embodiments are not limited to any particular machine learning technique. Example machine learning techniques include linear regression, logistic regression, decision trees, and support vector machines.

The training data comprises multiple training samples. Each training sample corresponds to a particular entity user and a particular content item that was presented to the particular entity user. Thus, each training sample corresponds to an impression data item. Training samples may only be generated for content items of the first type. Each training sample includes multiple feature values corresponding to multiple features and a label that indicates whether the corresponding entity user selected, viewed the video of, or otherwise interacted with the corresponding content item beyond the corresponding content item being presented to the corresponding entity user.

Example features of the machine-learned model include features of the corresponding user, such as job title, job industry, job seniority, skills, years of experience, academic degree earned, academic institution(s) attended, current employer, and previous employer(s).

Another feature of the machine-learned model is a gap feature that indicates, at the time of a corresponding impression, a number of content items between the corresponding content item and the previous content item of the first type in the instance of the content item feed corresponding to the impression. For example, when a particular content item of the first type is displayed, the content item feed in which the particular content item appeared included the following content items in the following order: CT21, CT11, CT22, CT23, CT24, and CT12. Content items CT11 and CT12 are content items of the first type and the other content items are of a different type, such as the second type. A training sample is generated for CT12 that indicates (1) that the CT12 was presented to a particular user and (2) whether CT12 was selected (e.g., clicked) by a user to which the content item feed was presented. A gap value for CT12 is three, because there are three content items (not of the first type) that are between CT12 and the immediately preceding content item of the first type, i.e., CT11.

Other features of the machine-learned model may include cross gap-user features, such as a job title feature crossed with a specific gap value. For example, if there are seven possible gap values, then, for a particular user feature, there are seven cross gap-user features, one for each of the seven possible gap values, plus one being the "reference" level. The reference level feature refers to the user feature itself without being crossed with any gap value. In an embodiment, instead of including, in the model, user features that are independent of the gap feature, the model includes cross gap-user features.

Another example feature of the machine-learned model is a position feature that indicates a position of the corresponding content item within the instance of the content item feed in which the content item was presented. In the example content item feed above, the position of CT12 is six, if the initial (or first) position in a content item feed is one; or the position of CT12 is five, if the initial (or first) position in a content item feed is zero.

If a training sample is generated for CT11 in the example content item feed above, then the gap value for CT11 may be one (even though there is no preceding content item of the first type in that content item feed) and the position value for CT11 may be two, indicating that CT11 occupies the second position in the content item feed.

For each member i and content item k, a predicted user selection rate may be designated as $pCTR_{ik}$, where the content item k is presented with gap j and at position m in a content item feed, a logistic regression model may be fitted where:

$$P_{ij} = P(\text{click}|\text{position}=m, \text{gap}=j, pCTR_{ik})$$

A feature space is defined as z={pCTR, position}, and the corresponding parameters/coefficients for z and the gap feature from the above logistic regression are θ and γ, respectively. A gap sensitivity value may be calculated as:

$$\text{shadowBid}_{j,x} = [1/(1+\exp(-z\theta-j\gamma))]/[1/(1+\exp(-z\theta))] = \\ (1+\exp(-z\theta))/(1+\exp(-z\theta-j\gamma)) \approx \exp(-z\theta)/\exp(-z\theta-j\gamma) = \exp((j, x)\gamma)$$

where x refers to a set of member features. This approximation is based on the assumption that $\exp(-z\theta) \gg 1$ and $\exp(-z\theta-j\gamma) \gg 1$, which holds true since $P_{ij}=1/(1+\exp(-z\theta-j\gamma))$ is a small number close to 0. Therefore, the shape parameter γ may be estimated from the above formulation.

Process for Generating Personalized Sensitivity Values

Figure 2:
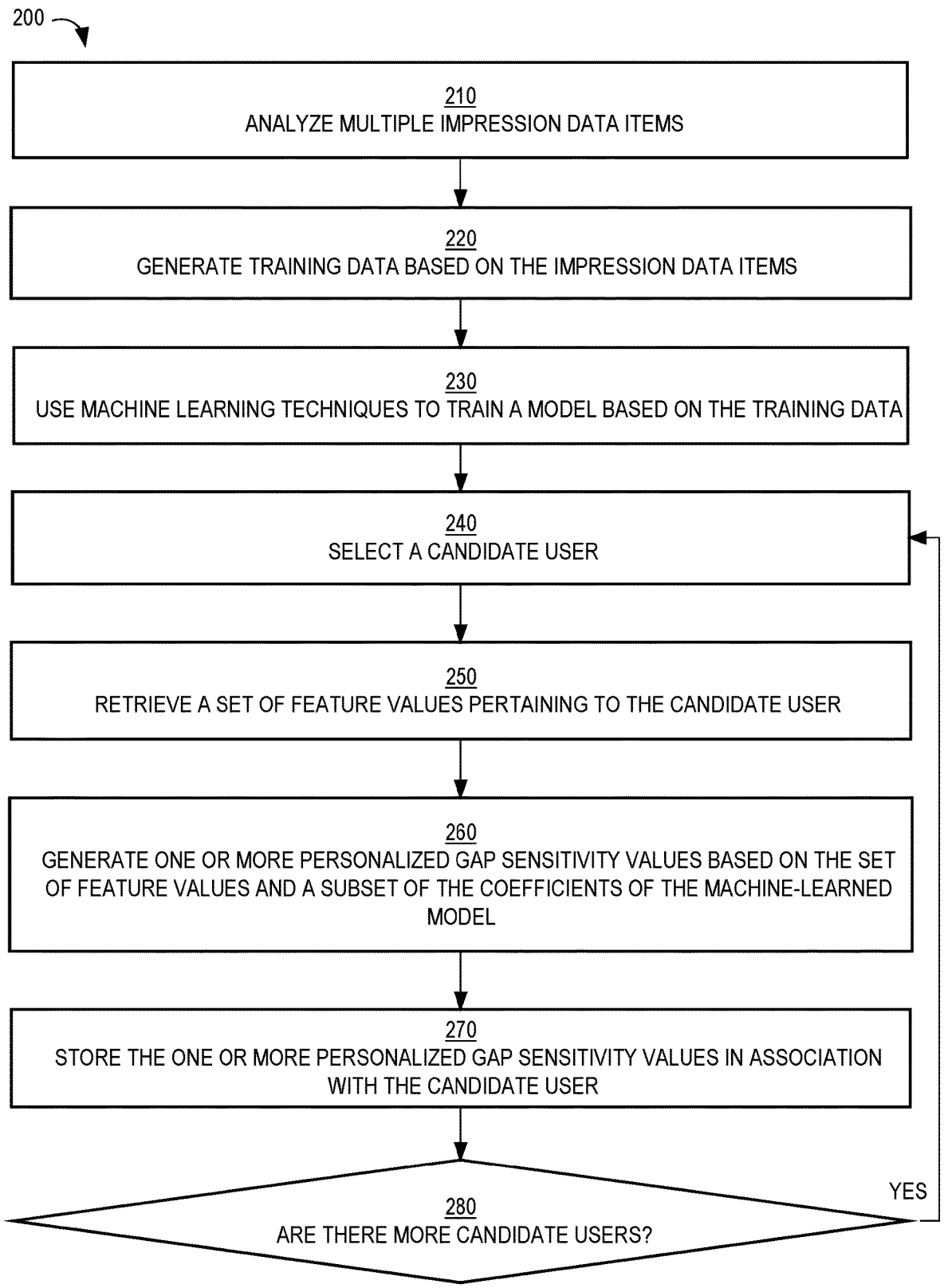
FIG. 2 is a flow diagram that depicts an example process for generating personalized sensitivity values, in an embodiment.

FIG. 2 is a flow diagram that depicts an example process 200 for generating personalized sensitivity values, in an embodiment. Process 200 may be implemented by content delivery system 120 or an affiliated system.

At block 210, multiple impression data items are analyzed. Each impression data item includes data about a content item of the first type that was presented on a computing device. Each impression data item may be limited to impression data items that are associated with a timestamp within a particular time range, such as the last two weeks of impression data items. Any impression data items outside the particular time range may be ignored or not considered.

An impression data item may include position data that indicates a position within an instance of a content item feed in which the corresponding content item was presented/ included. Or, the position data may be derived from (or included in) other tracking data.

Similarly, an impression data item may include gap data that indicates a gap, within an instance of a content item feed in which the corresponding content item was presented/ included, between the corresponding content item and a previous content item of the first type that also appeared before the corresponding content item in the instance of the content item feed. Or, the gap data may be derived from (or included in) other tracking data.

At block 220, multiple training instances/samples are generated, one for each impression data item. A training instance includes feature values associated with the impression, such as a gap value, a position value, a predicted user selection rate (which (1) may have been generated by another machine-learned model that takes into account user features and content item features in generating the prediction and (2) was used to select the corresponding content item in a content item selection event), and user feature values, such as those described previously. The user feature values may be retrieved for inclusion in the training instance by first identifying a user or entity identifier in the impression data item and then using the user/entity identifier to look up the feature values in an entity database, such as a profile database.

The training instance also includes a label indicating whether the corresponding content item was interacted with (e.g., clicked) by the corresponding user. The label may be determined from a click data item that corresponds to the corresponding impression data item. An impression data item and a click data item may be correlated based on one or more identifiers that are included in both data item, such as an identifier that uniquely identifies the content item selection event and/or an identifier that identifies a position within a content item feed in which the corresponding content item was included.

At block 230, a machine-learned model is trained based on the training data. An example of a machine-learning technique that may be used to train the model includes logistic regression. As part of the training process, multiple coefficients, one for each model feature, are refined/learned. One of the learned coefficients is for the gap value and other learned coefficients are for user features. Another of the learned coefficients may be for the position value.

At block 240, a candidate user in a set of candidate users is selected. The set of candidate users may be limited to a set of users for which feature values are known/accessible. Embodiments are not limited to the manner in which a candidate user is selected. For example, block 240 may involve randomly selecting from the set of candidate users. As another example, block 240 may involve selecting a candidate user that triggers content item selection events in content delivery system 120 most frequently relative to other candidate users in the set.

At block 250, a set of feature values pertaining to the selected candidate user is retrieved. The source of the set of feature values may be the same as the source of the feature values used to generate the training instances in block 220.

At block 260, one or more personalized gap sensitivity values are generated based on the set of feature values and a subset of the coefficients of the machine-learned model trained in block 230. The subset of the coefficients includes a coefficient for the gap feature and coefficients for (at least some of) the user features.

Block 260 may involve multiplying the coefficients of the user features with their corresponding user feature values, adding the results therefrom, and adding the coefficient for the gap feature. That result is then multiplied by a gap value (e.g., three, four, or five) to generate an exponent value. The exponent value ("exponent_value") is input to an e function where $e^{exponent\_value}$ is computed. The result of that function is a personalized gap sensitivity value. Each personalized gap sensitivity value is associated with a specific gap value, such as three or four.

In order to generate a personalized gap sensitivity value for additional gap values, the previous result (from adding the results of the multiplying and the coefficient for the gap feature) is multiplied by a different gap value (e.g., four instead of three). That result will be a new exponent value, which will be input to the e function to compute a personalized gap sensitivity value for the different gap value. Thus, if there are eight possible gap values, then eight personalized gap sensitivity values may be generated for the corresponding user.

At block 270, the generated personalized gap sensitivity values are stored in association with the candidate user. Block 270 may involve storing the personalized gap sensitivity values in a record associated with the candidate user. The record is accessible to content delivery system 120 while conducting a content item selection event that involves the candidate user.

At block 280, it is determined whether there are any more candidate users to consider. If so, process 200 returns to block 240 where another candidate user is selected. If not, then process 200 ends.

Inserting Content Items Into a Content Item Feed

Figure 3:
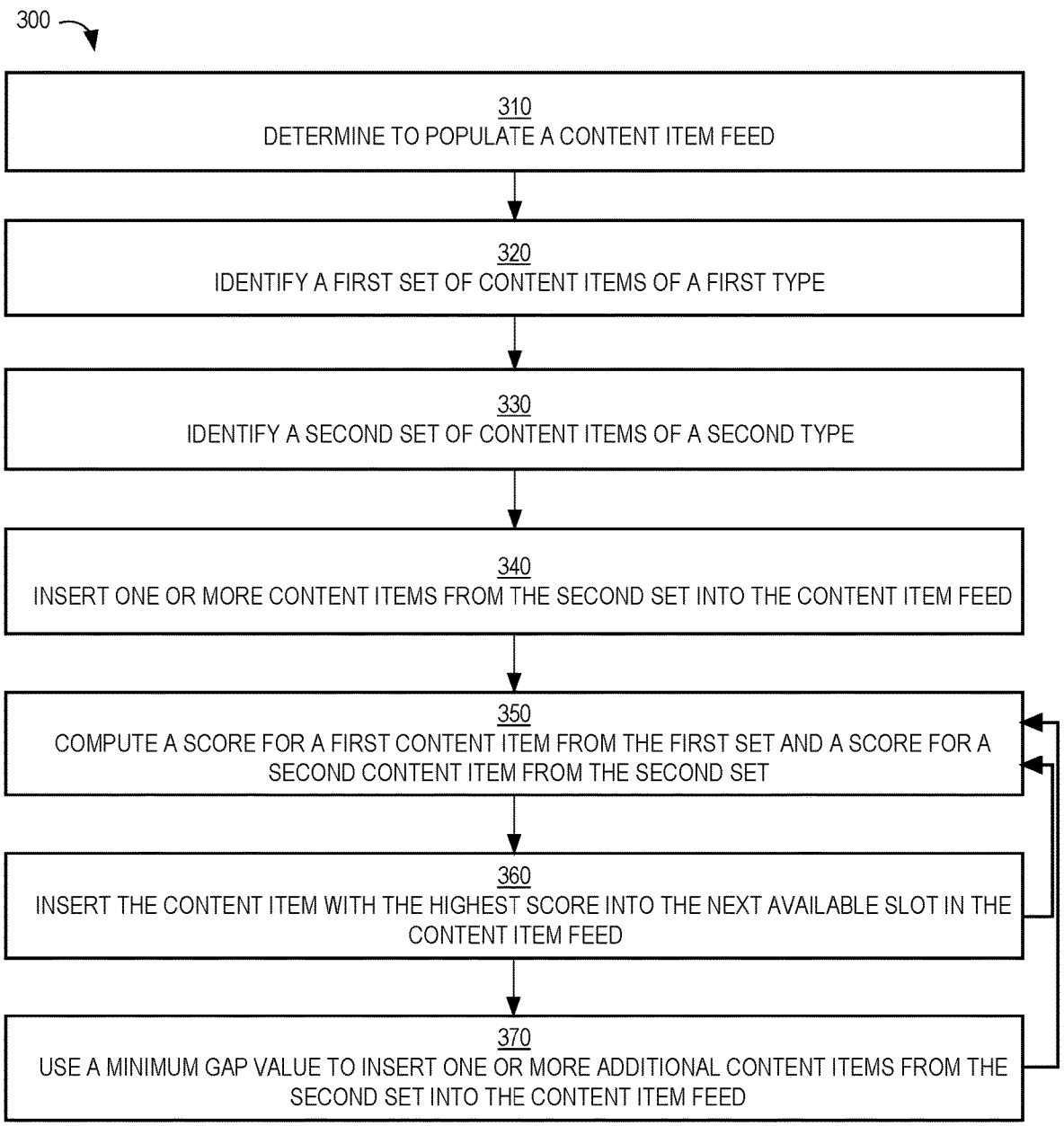
FIG. 3 is a flow diagram that depicts an example process for inserting content items from different queues into a single content item feed, in an embodiment.

FIG. 3 is a flow diagram that depicts a process 300 for inserting content items from different queues into a single content item feed, in an embodiment. Process 300 may be performed by content delivery system 120. Process 300 may be performed in conjunction with process 200.

FIGS. 4A-4E are block diagrams that depict two example queues 410 and 420 and an example content item feed 430 after the performance of different blocks of process 300, in an embodiment. In this example, queue 410 contains content items of the first type and queue 420 contains content items of one or more other types. In other scenarios, more than two queues are merged into a single queue, but one of those queues contains content items of the first type and no other queue contains content items of the first type.

At block 310, a determination to populate a content item feed is made. Block 310 may involve receiving a (e.g., HTTP) request from a client device. The request may indicate a type of content that is associated with a feed or a URL associated with web page that is to include a feed. The request may include an identifier that is used to look up a unique identifier for a user that is operating the client device. Thus, the request may come from a logged in or registered user. Otherwise, the request may be presumed to come from an unregistered or non-logged in user.

At block 320, a first set of content items of the first type are identified. This set of content items is referred to herein as the "first queue." The first queue may be ordered (or ranked) based on one or more criteria. For example, the first queue may be ordered based on a bid associated with each content item, a probability of a user (or the specific user that initiated the request) interacting with (e.g., clicking) each content item, and/or a quality metric associated with each content item. For example, each content item in the first queue may be ordered based on the product of a bid amount associated with the content item and a predicted user selection rate of the content item. Some users may have a higher propensity to click on some content items versus other content items. Thus, the predicted user selection rate of some content items may be higher than the predicted user selection rate of other content items. If used, one or more quality metrics may be incorporated into a user selection prediction model that generates the predicted user selection rates. Thus, all else being equal, the higher the quality of a content item, the higher the predicted user selection rate of that content item.

The user selection prediction model may be (a) a rules-based model where the coefficients of different features are manually tuned, or (b) a machine-learned model is trained where the coefficients of different features are automatically determined using one or more machine learning techniques, such as logistic regression, artificial neural networks using backpropagation, and gradient boosting. Example features of the prediction model may be classified as user features, content item features, context features, and cross user-content item features.

Example user features include actual or observed user selection rate of the corresponding user, current and past job titles, current and past employers, job industry, job function, seniority of current job position, academic degrees earned, academic institutions attended, geographic location, number of connections, number of connections classified as influencers, etc.

Example content item features include actual or observed user selection rate of the corresponding content item, identity of the content provider of the content item, features based on text within the content item, features based on an image or graphic within the content item.

Example contextual features include time of day, day of week, operating system of device operated by the user, whether the application that initiated the content request is a web application or a dedicated (e.g., smartphone) application.

Example cross user-content item features include the user's or the user segment's (to which the user is assigned) user selection rate with respect to content items from the same content provider as the current content provider of the corresponding content item, user-content provider affinity measured in terms of past interactions, user-content type affinity measured in terms of past interactions, and various permutations of all the features with each other.

At block 330, a second set of content items of the second type are identified. This set of content items is referred to herein as the "second queue." The second queue of content items may be ordered (or ranked) based on one or more criteria. For example, the second queue of content items may be ordered based on a probability of a user (or the specific user that initiated the request) interacting with (e.g., clicking) each content item and/or a quality metric associated with each content item. For example, each content item in the queue may be ordered based on a predicted user selection rate generated for each content item. Some users may have a higher propensity to click on some content items versus other content items. Thus, the predicted user selection rate of some content items may be higher than the predicted user selection rate of other content items.

The prediction model used to generate predicted user selection rates for content items of the second type may be different than the prediction model used to generate predicted user selection rates for content items of the first type. For example, the number and/or types of features may be very different.

Figure 4A:
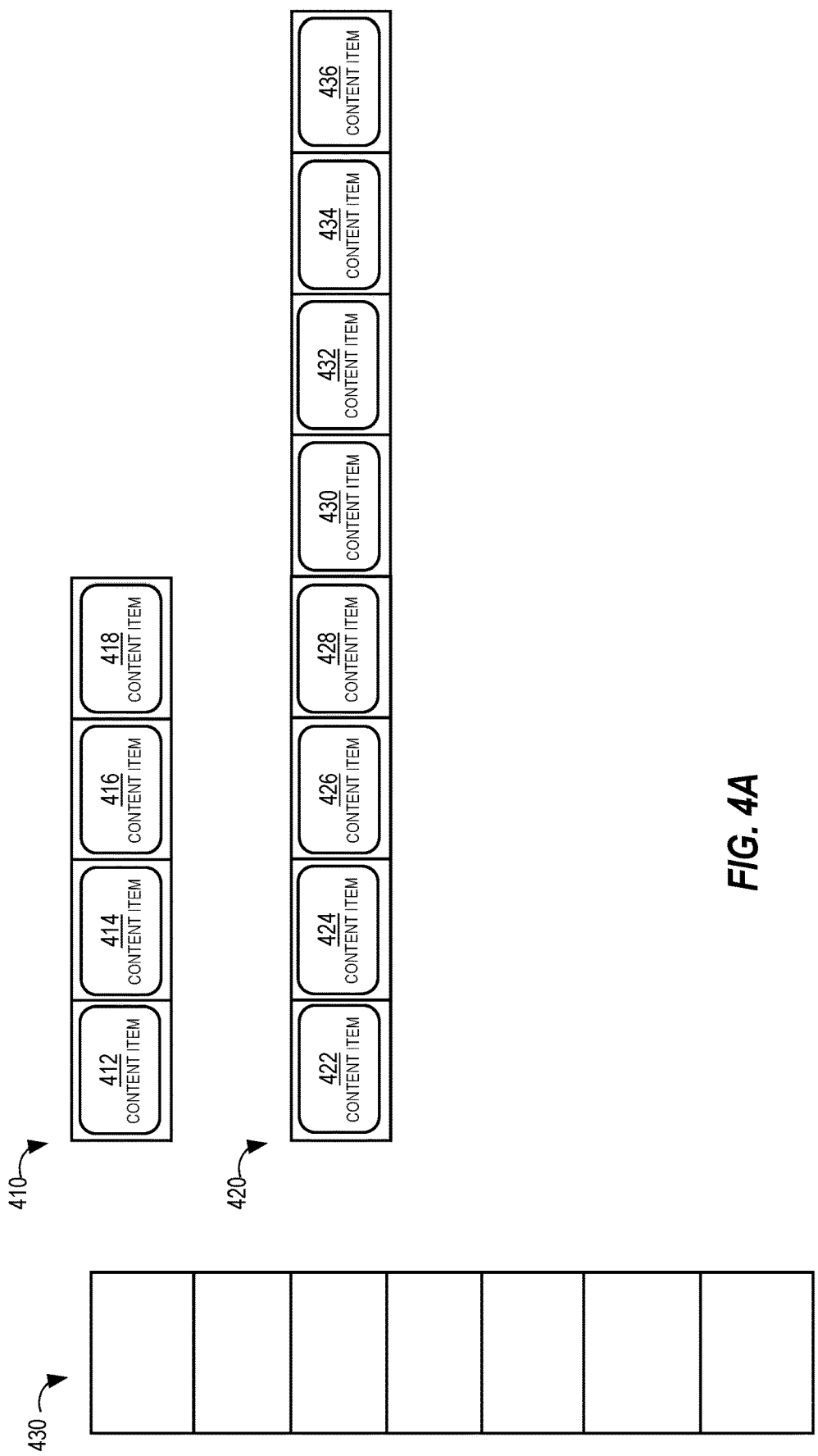

FIG. 4A is a block diagram that depicts queues 410 and 420 and content item feed 430 prior to performance of block 340.

At block 340, one or more content items of the second type are inserted into one or more slots in the content item feed. The one or more content items are selected (and removed) from the second queue. (Removal may be actual removal or the one or more content items may be marked as already selected so that they are not considered again for insertion into the content item feed.) The selection may be from the highest ranked content item(s) in the second queue. The number of content items inserted in block 340 may depend on a top slot parameter that is set (or established). For example, if the top slot parameter is set to three, then the first two slots are filled with content items of the second type.

FIG. 4B is a block diagram that depicts queues 410 and 420 after two content items from queue 420 have been inserted into content item feed 430 and removed from queue 420.

At block 350, scores for the content items at the top of the respective queues are computed. For example, a first score of a first content item in the first queue is computed and a second score of a second content item in the second queue is computed. The first score is based on a predicted user selection rate (e.g., pCTR) of the first content item, a bid amount of the first content item, and, optionally, a shadow bid amount. For example, the first score of the first content item=(shadow bid value*predicted user selection rate)+(bid amount*predicted user selection rate).

This score combines two different utilities: a revenue utility and an engagement/organic utility. Engagement/organic utility refers to the benefit that a user's engagement has on publisher system 130. A user's engagement with a content item is an indication that the user finds value in the content item. Accordingly, the user is more likely to engage with publisher system 130 in the future.

The second score is based on a personalized gap sensitivity value and a predicted user selection rate of the second content item. For example, the second score of the second content item equals the personalized gap sensitivity value multiplied by a predicted user selection rate of the second content item. Alternatively, the first score is divided by the personalized gap sensitivity value.

The personalized gap sensitivity value is a pre-computed value that is retrieved from a record that is associated with the user. Thus, block 350 (or an earlier block) involves looking up a record, associated with the user, that stores one or more personalized gap sensitivity values. The gap sensitivity value that is retrieved is associated with a current gap value. Thus, block 350 (or an earlier block) involves identifying a current gap value of the first content item.

The second score may be based on additional factors. For example, the second score may be based on a downstream network interaction model that takes into account what might happen in a user's social network if the user performed an action with respect to a content item in his/her feed. As a specific example, if the user to which the second content item is presented has relatively many connections, then the value to publisher system 130 is greater than if the user has relatively few connections in the social network. This is because if the user interacts with the second content item (e.g., clicks, views, likes, shares, comments on), then many of the user's connections in the social network might be notified. Thus, the second score may be higher depending on the user to which the second content item is being presented. Also, if a user is considered "influential" in the sense that a relatively high percentage of the user's connections view, click, comment on, share or otherwise interact with content items that the user has posted or interacted with in the past, then a value from the downstream network interaction model will be higher, causing the second score for that user to be higher than if the user was not an influential connection.

As another example, a user's selection of content items of the second and other types are more likely to result in future downstream interactions by the user with other content provided/hosted by publisher system 130. In contrast, user selection of content items of the first type might result in the user being directed to a different website provided/hosted by a computer system different than publisher system 130. Thus, the likelihood of returning to publisher system 130 is less than if a content item of the second type was selected and, accordingly, the lower the engagement utility of content items of the first type.

At block 360, the content item that is associated with the highest score is inserted into the next available slot in the content item feed and is removed from the corresponding queue. For example, if the first score is higher than the second score, then the first content item is inserted into the next available slot and is removed from the first queue. If the content item that is selected for insertion into the content item feed is of the first type, then process 300 returns to block 350. If the content item that is selected for insertion into the content item feed is of the second type, then process 300 proceeds to block 370.

Figure 4C:
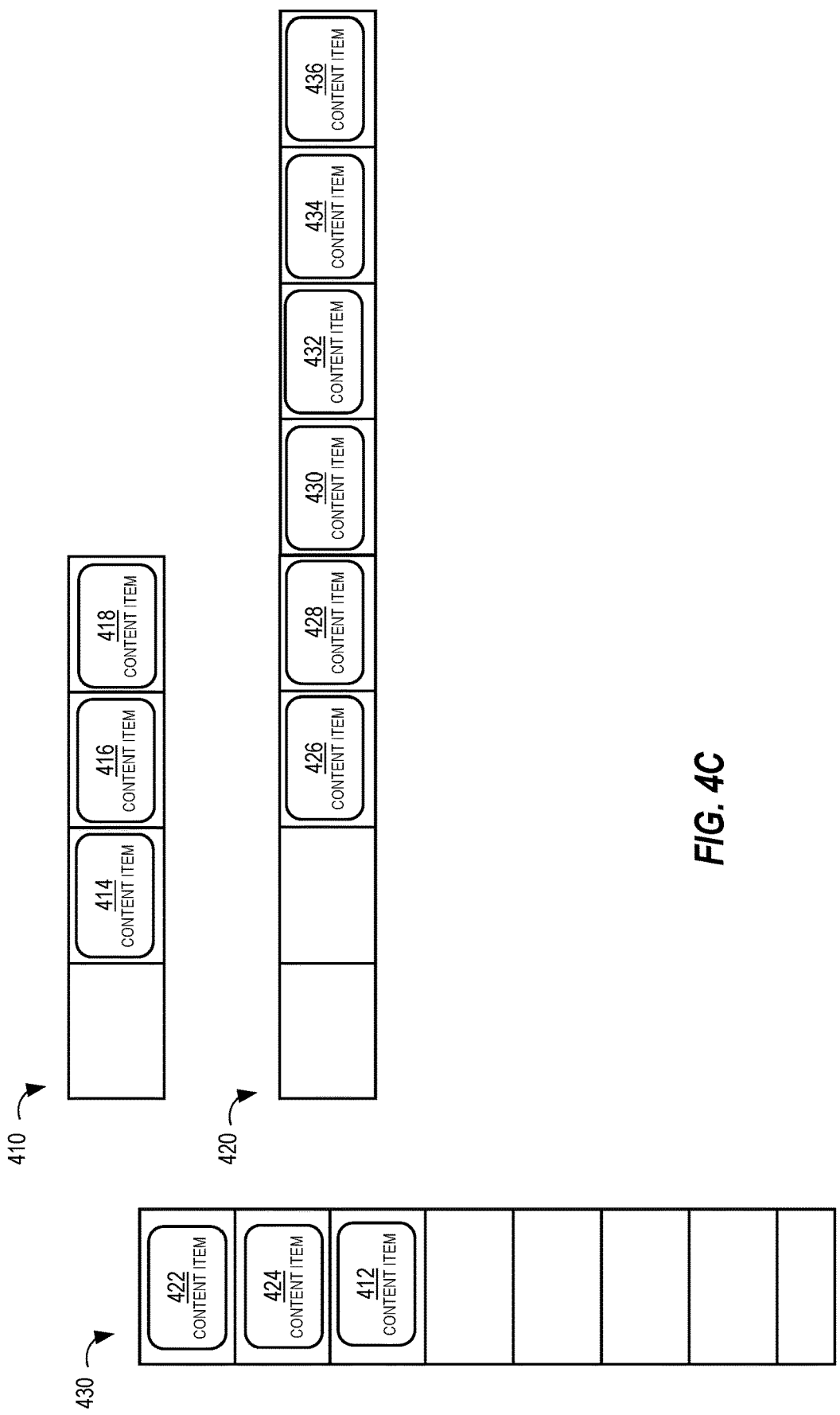

FIG. 4C is a block diagram that depicts queues 410 and 420 after a content item from queue 510 has been inserted into content item feed 430 and removed from queue 410.

At block 370, a minimum gap value is used to insert zero or more content items of the second type in the next one or more available slots of the content item feed. For example, if the minimum gap value is three, then the next three slots are filled with content items from the second queue. The one or more content items that are inserted into the next available slots may be the next highest ranked content items in the second queue.

Figure 4D:
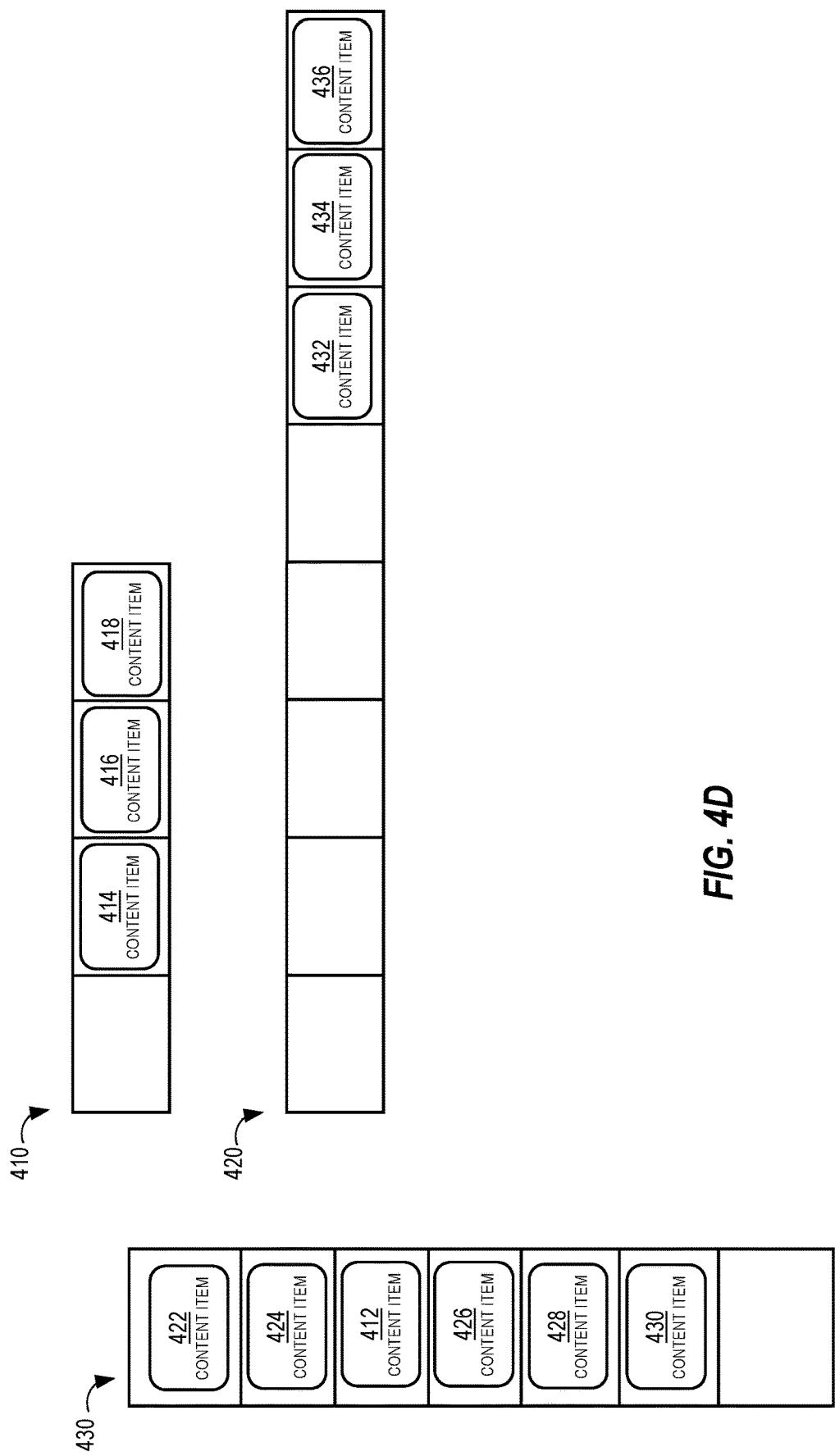

FIG. 4D is a block diagram that depicts queues 410 and 420 after three content items from queue 420 have been inserted into content item feed 430 and removed from queue 420.

During the first iteration of block 370, the current gap value is a certain value (e.g., 0, 1, or 3). If the first content item (i.e., of the first type) is selected for insertion in the current slot, then the current gap value is reset to 0 and process 300 returns to block 350. If the second content item is selected for insertion in the current slot position, then the current gap value increases by one. Whichever content item is selected, a pointer or reference to the current slot position is incremented. For example, if the current slot position at block 360 is slot position 4, then, after block 370, the current slot position becomes slot position 7 (in the case where three content items of the second type are inserted into the content item feed). Also, even if, for example, the first content item is selected, a new second score will be generated for the second content item in the next iteration of block 350 since the current gap value will be different. Therefore, the second score used during one iteration of block 360 should not be used in the immediately subsequent iteration of block 360.

Figure 4E:
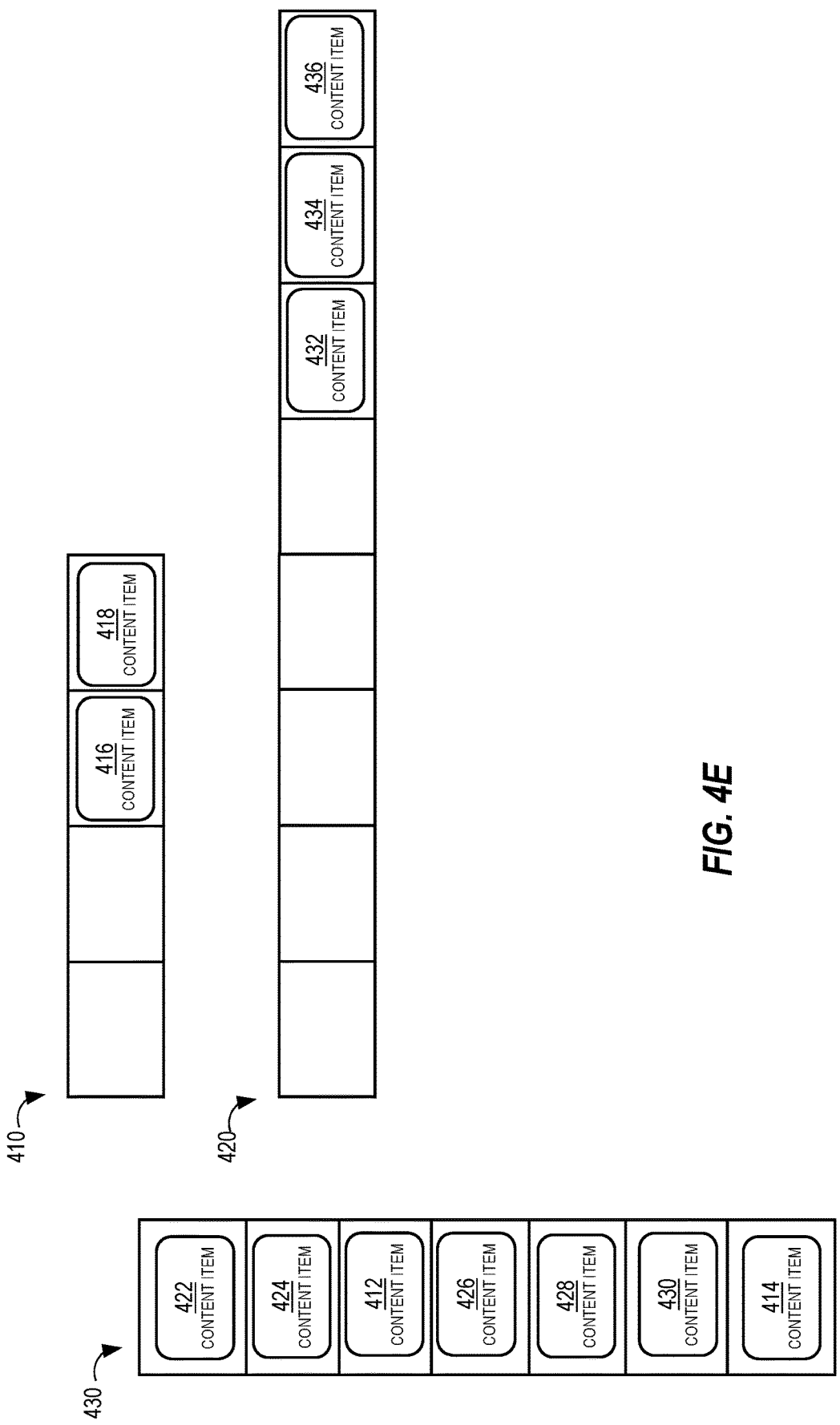

Process 300 returns to block 350 and may continue for multiple cycles. FIG. 4E is a block diagram that depicts queues 410 and 420 after another content item from queue 410 has been inserted into content item feed 430 (as a result of a second iteration of block 360) and removed from queue 410.

Process 300 may continue as long as a user scrolls through the content item feed. For example, process 300 may continue until ten slots (in the content item feed) that have not yet been displayed have been filled with content items. If the user scrolls down so that at least some of those ten slots are displayed, then process 300 may continue virtually indefinitely, or until the first queue and/or second queue are empty.

In a related embodiment, block 340 is skipped, indicating that there is no top slot parameter. In this embodiment, the current gap value is presumed to be 0 (or 1) for the first slot in the content item feed. Thus, it is more likely that content items of the second type are selected for insertion into the first and second slots of the content item feed than content items of the first type.

In a related embodiment, block 370 is skipped, indicating that there is no minimum gap parameter. Thus, after block 360 (and the current slot position value is incremented by one so that it points to the next available slot position), process 300 returns to block 350.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
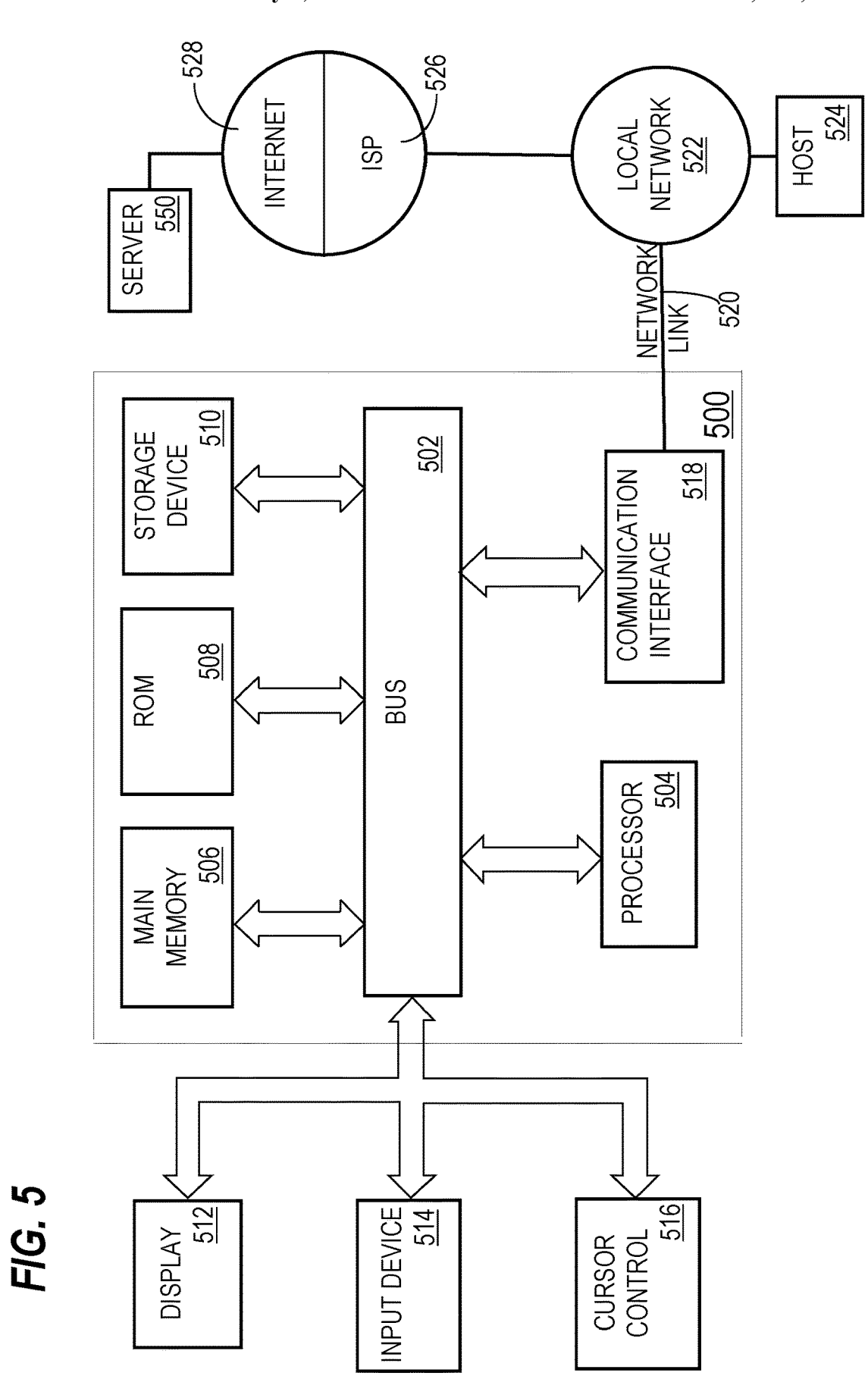
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for personalizing content item type density in a digital content item feed, comprising:
   in response to receiving a content request, identifying an entity that is associated with the content request;
   presenting a content item feed on a user interface of a computing device;
   the content item feed scrollable by a user of the computing device;
   identifying a plurality of sets of content items that includes a first set of content items of a first type and a second set of content items of a second type different than the first type;
   determining a first position of a first slot in the content item feed that comprises a plurality of slots;
   determining a second position of a previous content item, in the content item feed, that is of the first type;
   determining a gap value that indicates a number of slots between the first position and the second position;
   based on the gap value, determining a gap sensitivity value that is associated with the entity and that is different than the gap value and that is specific to the user who scrolls the content item feed;
   based on the gap sensitivity value, selecting a content item from one of the plurality of sets of content items;

inserting the selected content item into the first slot; and
causing the selected content item to be presented in the content item feed at a position associated with the first slot on the user interface of the computing device;
wherein the method is performed by one or more computing devices.

2. The method of claim 1, wherein the gap sensitivity value is also based on the first position relative to a beginning of the content item feed.

3. The method of claim 1, further comprising:
determining, for a first content item from the first set of content items, a first predicted user selection rate based on the identity of the entity; and
determining, for a second content item from the second set of content items, a second predicted user selection rate based on the identity of the entity;
wherein selecting the content item comprises selecting the first content item or the second content item; and
wherein selecting is further based on the first predicted user selection rate and the second predicted user selection rate.

4. The method of claim 3, wherein:
determining the first predicted user selection rate comprises using a first machine-learned model to compute the first predicted user selection rate; and
determining the second predicted user selection rate comprises using a second machine-learned model that is different than the first machine-learned model, to compute the second predicted user selection rate;
wherein a first set of features upon which the first machine-learned model was trained is different than a second set of features upon which the second machine-learned model was trained.

5. The method of claim 1, wherein the selected content item is of the second type and the gap sensitivity value is a first gap sensitivity value, the method further comprising:
determining a third position of a second slot in the content item feed;
determining a second gap value between the third position and the second position;
based on the second gap value, determining a second gap sensitivity value that is associated with the entity and that is different than the first gap sensitivity value;
based on the second gap sensitivity value, selecting a second content item from one of the plurality of sets of content items; and
inserting the second content item into the second slot;
wherein causing the content item feed to be presented on the computing device is performed after inserting the second content item into the second slot.

6. The method of claim 1, further comprising:
for each user of a plurality of users:
storing a plurality of gap sensitivity values that are specific to said each user, wherein each gap sensitivity value in the plurality of gap sensitivity values is associated with a different gap value;
wherein the entity is one of the users in the plurality of users; and
wherein the gap sensitivity value is in the plurality of gap sensitivity values for the entity.

7. The method of claim 6, further comprising:
generating the plurality of gap sensitivity values based on one or more positions of one or more content items of the first type in different instances of the content item feed.

8. The method of claim 1, further comprising:
training a machine-learned model based on training data that comprises a plurality of training samples; and
for each user of a plurality of users:
identifying multiple feature values associated with said each user;
based on the multiple feature values and a set of coefficients of the machine-learned model, generating one or more gap sensitivity values for said each user; and
storing the one or more gap sensitivity values in association with said each user.

9. The method of claim 8, wherein:
the machine-learned model is based on a plurality of features that includes a gap feature;
each training sample in the plurality of training samples (1) corresponds to a certain user and a certain content item that was presented to the certain user and (2) comprises a plurality of feature values and a label indicating whether the certain user associated with the training sample selected the certain content item; and
one of the plurality of feature values corresponds to the gap feature and indicates a gap between the certain content item and a previous certain content item, in an instance of the content item feed, wherein the previous certain content item is of the first type.

10. The method of claim 9, wherein:
the plurality of features includes a position feature; and
one of the plurality of feature values corresponds to the position feature and indicates a position of the certain content item within the instance of the content item feed.

11. One or more non-transitory storage media storing instructions which, when executed by one or more processors, cause:
presenting a content item feed on a user interface of a computing device;
the content item feed scrollable by a user of the computing device;
identifying a plurality of sets of content items that includes a first set of content items of a first type and a second set of content items of a second type different than the first type;
determining a first position of a first slot in a content item feed that comprises a plurality of slots;
determining a second position of a previous content item, in the content item feed, that is of the first type;
determining a gap value that indicates a number of slots between the first position and the second position;
based on the gap value, determining a gap sensitivity value that is associated with the entity and that is different than the gap value and that is specific to the user who scrolls the content item feed;
based on the gap sensitivity value, selecting a content item from one of the plurality of sets of content items;
insert the selected content item into the first slot; and
causing the selected content item to be presented in the content item feed at a position associated with the first slot on the user interface of the computing device.

12. The one or more non-transitory storage media of claim 11, wherein the gap sensitivity value is also based on the first position relative to a beginning of the content item feed.

13. The one or more non-transitory storage media of claim 11, wherein the instructions, when executed by the one or more processors, further cause:
determining, for a first content item from the first set of content items, a first predicted user selection rate based on the identity of the entity; and determining, for a second content item from the second set of content items, a second predicted user selection rate based on the identity of the entity;
wherein selecting the content item comprises selecting the first content item or the second content item; and
wherein selecting is further based on the first predicted user selection rate and the second predicted user selection rate.

14. The one or more non-transitory storage media of claim 13, wherein:
determining the first predicted user selection rate comprises using a first machine-learned model to compute the first predicted user selection rate;
determining the second predicted user selection rate comprises using a second machine-learned model, that is different than the first machine-learned model, to compute the second predicted user selection rate; and
a first set of features upon which the first machine-learned model was trained is different than a second set of features upon which the second machine-learned model was trained.

15. The one or more non-transitory storage media of claim 11, wherein the selected content item is of the second type and the gap sensitivity value is a first gap sensitivity value, wherein the instructions, when executed by the one or more processors, further cause:
determining a third position of a second slot in the content item feed;
determining a second gap value between the third position and the second position;
based on the second gap value, determining a second gap sensitivity value that is associated with the entity and that is different than the first gap sensitivity value;
based on the second gap sensitivity value, selecting a second content item from one of the plurality of sets of content items; and
inserting the second content item into the second slot;
wherein causing the content item feed to be presented on the computing device is performed after inserting the second content item into the second slot.

16. The one or more non-transitory storage media of claim 11, wherein the instructions, when executed by the one or more processors, further cause:
for each user of a plurality of users:
storing a plurality of gap sensitivity values that are specific to said each user, wherein each gap sensitivity value in the plurality of gap sensitivity values is associated with a different gap value;
wherein the entity is one of the users in the plurality of users; and
wherein the gap sensitivity value is in the plurality of gap sensitivity values for the entity.

17. The one or more non-transitory storage media of claim 16, wherein the instructions, when executed by the one or more processors, further cause:
generating the plurality of gap sensitivity values based on one or more positions of one or more content items of the first type in different instances of the content item feed.

18. The one or more non-transitory storage media of claim 11, wherein the instructions, when executed by the one or more processors, further cause:
training a machine-learned model based on training data that comprises a plurality of training samples; and
for each user of a plurality of users:
identifying multiple feature values associated with said each user;
based on the multiple feature values and a set of coefficients of the machine-learned model, generating one or more gap sensitivity values for said each user; and
storing the one or more gap sensitivity values in association with said each user.

19. The one or more non-transitory storage media of claim 18, wherein:
the machine-learned model is based on a plurality of features that includes a gap feature;
each training sample in the plurality of training samples (1) corresponds to a certain user and a certain content item that was presented to the certain user and (2) comprises a plurality of feature values and a label indicating whether the certain user associated with the training sample selected the certain content item; and
one of the plurality of feature values corresponds to the gap feature and indicates a gap between the certain content item and a previous certain content item, in an instance of the content item feed, wherein the previous certain content item is of the first type.

20. The one or more non-transitory storage media of claim 19, wherein:
the plurality of features includes a position feature; and
one of the plurality of feature values corresponds to the position feature and indicates a position of the certain content item within the instance of the content item feed.

* * * * *